United States Patent
Feleppa

Patent Number: 5,700,102
Date of Patent: Dec. 23, 1997

[54] SHELTER FRAME CONNECTOR SYSTEM

[76] Inventor: Richard Feleppa, 1971 NW. 35th Terrace, Coconut Creek, Fla. 33066

[21] Appl. No.: 604,151

[22] Filed: Feb. 20, 1996

[51] Int. Cl.$^6$ ................................. F16B 7/10
[52] U.S. Cl. ................... 403/170; 403/97; 403/174; 403/217
[58] Field of Search .................. 403/91, 92, 93, 403/994, 95, 96, 97, 98, 99, 100, 101, 102, 103, 169, 170, 174, 176, 178, 217, 218, 219

[56] References Cited

U.S. PATENT DOCUMENTS

| | | | |
|---|---|---|---|
| 117,623 | 8/1871 | Hamler . | |
| 295,922 | 4/1884 | Hood | 403/97 X |
| 856,237 | 6/1907 | Ferriott | 403/97 |
| 944,578 | 12/1909 | Paul | 403/176 X |
| 1,483,602 | 2/1924 | Bloss et al. | 403/174 X |
| 1,495,565 | 5/1924 | Yorke | 403/174 |
| 1,661,873 | 3/1928 | Buxbaum . | |
| 1,934,910 | 11/1933 | Buhr | 403/97 X |
| 2,672,313 | 3/1954 | Poole | 403/97 X |
| 3,124,370 | 3/1964 | Traugott | 403/97 X |
| 3,126,191 | 3/1964 | Holden | 403/97 X |
| 3,495,857 | 2/1970 | Hawke | 287/54 |
| 3,727,362 | 4/1973 | Ellison et al. | 403/174 X |
| 3,914,063 | 10/1975 | Papyoti | 403/176 X |
| 3,922,481 | 11/1975 | Lewis | 403/97 X |
| 4,074,682 | 2/1978 | Yoon | 403/100 X |
| 4,247,218 | 1/1981 | Jeannin | 403/217 |
| 4,505,609 | 3/1985 | Vella | 403/91 |
| 4,838,003 | 6/1989 | Zeigler | 403/176 X |
| 5,133,553 | 7/1992 | Divnick | 403/97 X |
| 5,167,246 | 12/1992 | Mortenson | 135/106 |
| 5,224,320 | 7/1993 | Mai | 403/176 X |
| 5,538,245 | 7/1996 | Moore | 403/97 X |
| 5,564,852 | 10/1996 | Maxwell et al. | 403/97 |

FOREIGN PATENT DOCUMENTS

| | | | |
|---|---|---|---|
| 572045 | 10/1958 | Belgium | 403/97 |
| 356920 | 2/1938 | Italy | 403/97 |
| 6508364 | 12/1965 | Netherlands | 403/174 |

*Primary Examiner*—Blair Johnson
*Assistant Examiner*—Bruce A. Lev
*Attorney, Agent, or Firm*—Alvin S. Blum

[57] ABSTRACT

A connector system joins together long rods or tubes at various angles to form a wide variety of shelter frames for diverse applications as well as railings, racks, and the like. The diverse connectors required are assembled from modules of the invention which are bolted together in various combinations. The modules fasten at one end to the rods or tubes. The other end of the module terminates in an annular gear adapted to intermesh at an adjustable angle with one or more gears of other modules. Once bolted together the modules form a rigid connector. The modules may be unbolted and reused to form a connector of another configuration. The few module types required to form the many connector configurations reduces inventory and manufacturing requirements.

18 Claims, 7 Drawing Sheets

SHELTER FRAME CONNECTOR SYSTEM

This invention relates to frames for fabric covered shelters of a wide variety of configurations, and more particularly to a frame system employing a minimal number of different simple component modules which may be combined to produce the larger number of much more complex connectors required to assemble the many frame configurations commonly employed.

BACKGROUND OF THE INVENTION

Many temporary fabric covered shelters are erected and stricken daily at fairs, flea markets and the like. Such shelters are also employed more permanently as carports and boat shelters.

The frames are generally made up of rigid metal rods or pipes joined together by sleeve connectors locked in place by set screws. The sleeve connectors are generally formed of sections of pipe welded together at various angles with various branches as required. Alternatively, the connectors can be molded or cast in one piece. Because of the complexity of the various connectors, the tooling costs of the castings and the unit costs of the welded connectors is very high. Furthermore, there are so many different connector shapes that the supplier of these frames such as a canopy rental firm at a flea market, or a hardware store, must carry a very large inventory of connectors to satisfy the demands of the different shelter configurations.

The frames are usually available for pipes of two different sizes, which double the inventory that must be carried. Since the unit costs of these connectors is so high, the cost of maintaining an adequate inventory is very high. And the cost of storing the many bulky connectors in separate compartments is also high.

If someone has purchased connectors. Suitable for one configuration, any later change in the configuration generally requires that most or all of the connectors must be replaced.

SUMMARY OF THE INVENTION

It is accordingly an object of the invention to provide a frame connector system comprising certain modules which may be combined in a variety of combinations and configurations to provide the various frame connectors required for shelter frames of a wide variety of configurations. It is another object that the connectors not only be reusable, but that they also may be disassembled into their component modules and reassembled into other connectors of: different configurations to assemble different frame shapes.

These and other objects, features and advantages of the invention will become more apparent when the detailed description is studied in conjunction with the drawings in which like reference characters refer to like elements in the various figures.

BRIEF DESCRIPTION OF THE DRAWINGS

FIGS. 1–50 are perspective views of a variety of connectors formed by combining modules of the invention.

DETAILED DESCRIPTION OF PREFERRED EMBODIMENTS

Figures 51, 52, 53, 54, 55, 61, 62, 63:
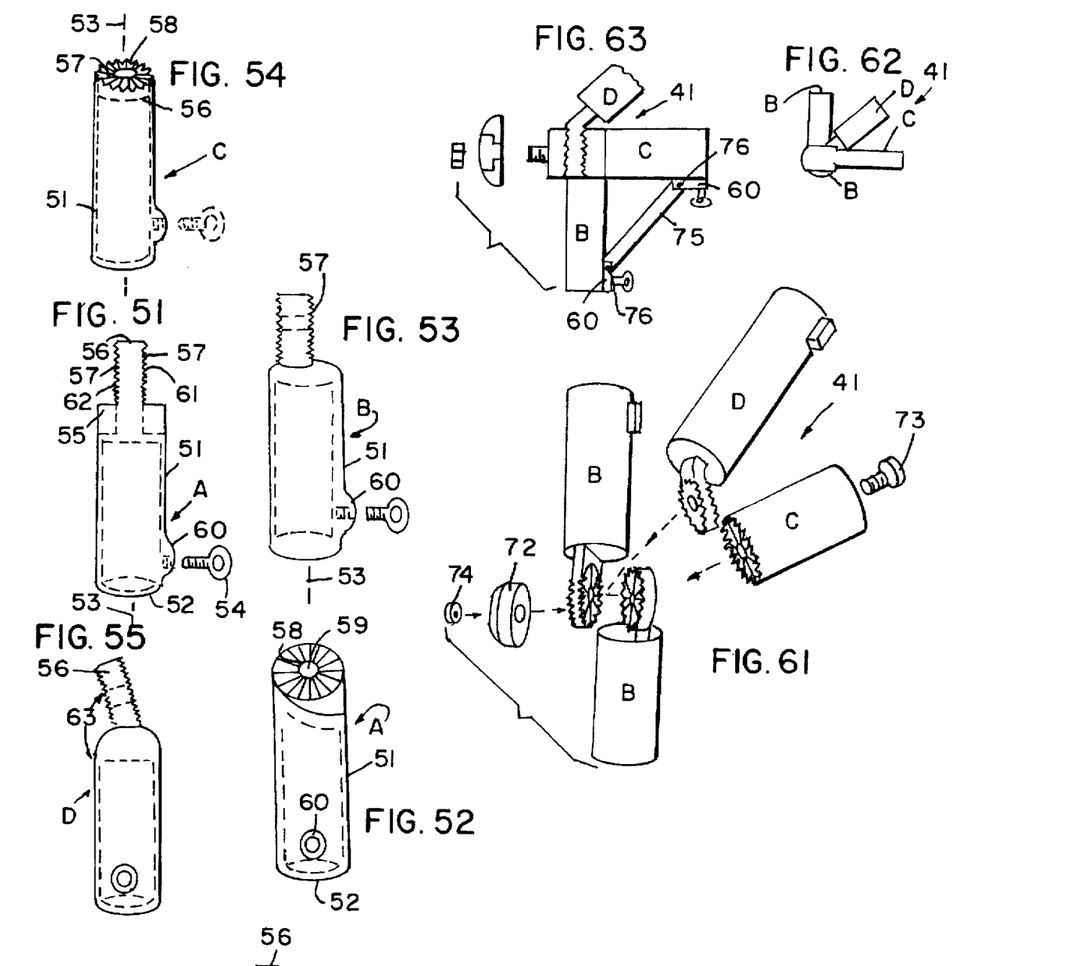
FIG. 51 is a front perspective vie of a first module of the invention.
FIG. 52 is a side perspective view of the module of of FIG. 51.
FIGS. 53–55 are front perspective views of three other modules of the invention.
FIG. 61 is an exploded view of another connector formed by combining modules of the invention.
FIG. 62 is a top view of the assembled connector of FIG. 61.
FIG. 63 is a side view of the assembled connector of FIG. 61.

Referring now first to FIGS. 51, 52, a first module (a) comprises a tubular member 51 having an open first end 52 for receiving therein an elongate rigid rod or tube member. A threaded boss 60 receives a screw or eyebolt 54 disposed transverse to the long axis 53 of member 51 for binding against the rod or tube. The second end 55 supports a lug 56 with two broad parallel faces 57 lying in planes adjacent and parallel to long axis 53 of member 51 on opposite sides thereon. Each face has intermeshing means 58 such as a crown gear with ridges 61 and valleys 62 arranged continuously and contiguously in an annulus about a center hole 59, to mate with similar intermeshing means at adjustable angles and to be held together at an angle by a bolt through the hole.

Referring now to FIG. 53, a second module (b) comprises a tubular member 51 as in (a), in which the lug 56 is positioned asymmetrically with one face 57 lying substantially along the long axis 53.

Referring now to FIG. 54, a third module (c) comprises a tubular member 51 as in (a) and (b). The lug 56 with intermeshing means 58 only on the outer face 57. The lug is disposed with its broad outer face 57 lying in a plane transverse to the long axis 53.

Referring now to FIG. 55, a fourth module (d) comprises a tubular member 51 as in (a), (b) and (c). The lug 56 with a pair of intermeshing means 58 is disposed with the broad parallel faces 57 lying in planes intersecting the long axis 53 at an angle 63 of between about 15° to about 75°.

Figure 56:
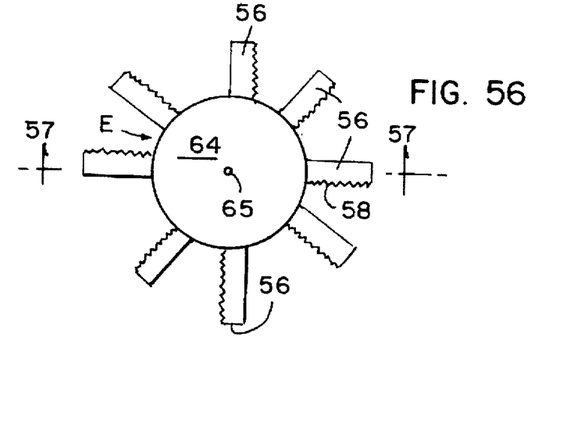
FIG. 56 is a top view of another module of the invention.
Figure 57:
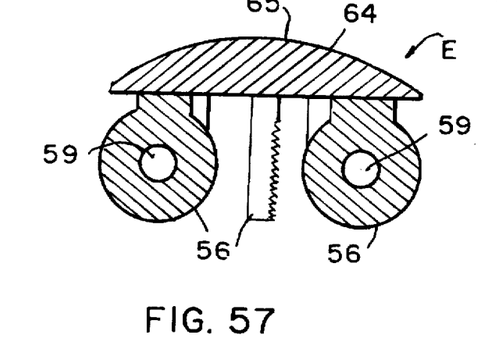
FIG. 57 is a sectional view taken through line 57—57 of FIG. 56.

Referring now to FIGS. 56 and 57, a fifth module (e) has a smooth spheroidal top 64 so that a fabric cover lying on it at the peak of a shelter will be undamaged. A plurality of lugs 56 having intermeshing means 58 on one or both faces are attached underneath top 64 with the facial planes arranged radially about a center point 65.

Figure 58:
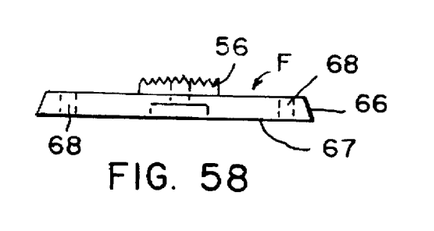
FIG. 58 is a side view of another module of the invention.

Referring now to FIG. 58, a sixth module (f) is shown having a body 66 with a flat bottom 67 and screw holes 68 for attaching to a flat surface such as a wall or floor. A lug 56 with intermeshing means 58 lies parallel to the bottom surface. The body 66 extends beyond the lug on all sides thereof, as shown.

Figure 59:
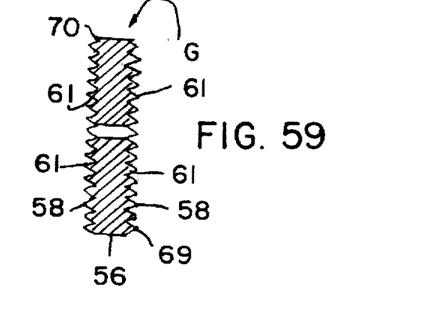
FIG. 59 is a sectional view of another module of the invention.

Referring now to FIG. 59, a seventh module (g) is a lug 56 having intermeshing means 58 on both faces. It is an angle shifting disc that is interposed between adjacent intermeshing means of two other modules to change the angle at which the two other modules meet. In the example shown, when disc (g) is applied to an other intermeshing means, every ridge 61 of face 69 will fit into a valley of the other intermeshing means and present a ridge 61 on outer face 70. This is the equivalent of having rotated the other intermeshing means through an angle equal to half of the angle between ridges. The disc (g) may be made with other degrees of angle shifting as desired. In a preferred embodiment there are 36 ridges in the annulus representing angular steps of ten degrees. The particular disc (g) shown shifts the angle five degrees.

Figure 60:
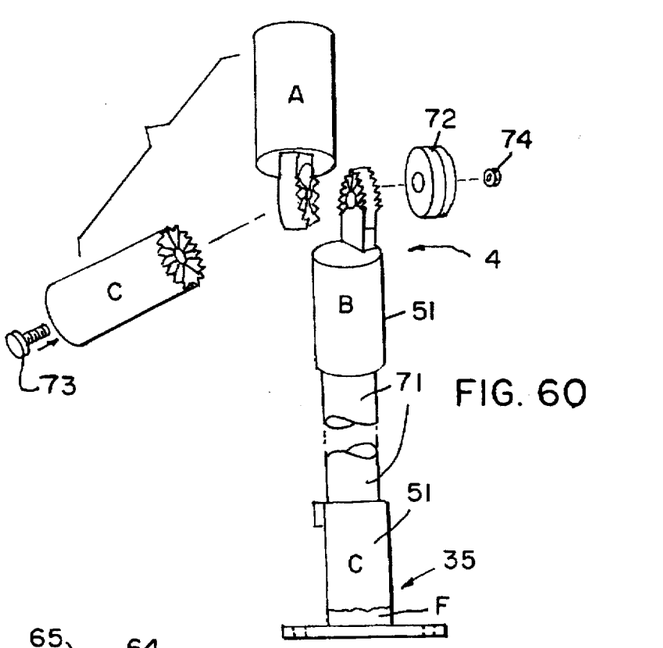
FIG. 60 is an exploded view of one connector in combination with an elongate rigid element and another connector formed by combining modules of the invention, the elongate rigid element fitting inside the modules.

Referring now to FIG. 60, the modules (c) and (f) are joined together by a through bolt (not shown) to form connector 35 which may serve as a foot for a shelter frame and which receives, in tubular member 51, an elongate rigid element 71 such as a steel or aluminum rod or tube. Mounted on the upper end of tube or rigid element 71 is corner connector 4 shown in exploded view. This is formed by bolting together modules (a), (b) and (c) with bolt 73, faired washer 72, and nut 74 to provide a smooth outer joint face to any fabric. The tubular members 51 then receive rigid tubular elements as desired to make up the frame module (a) may be joined to module (b) at selected angular increments as required before tightening the bolt. Having the lugs of modules (b) and (c) on either side of the lug of module (a) reasonably centers the tubes attached to (a) and (b) which will be out of alignment half the width of a lug. If two modules (b) were used, they would be aligned but the lug of (c) would extend beyond the joint.

Referring now to FIGS. 61–63, the connector 41 is shown in exploded, top and side views respectively. This connector may be advantageously employed in the construction of the frame of FIG. 67, for example. By interposing the lug of module (d) between the lugs of modules (b), the tubes attached thereto will be misaligned by a lug width. If the lug of module (d) is interposed between module (c) and one of module (b) (not shown) then tubes attached to modules (b) will be aligned and (d) will be displaced by a lug width from the center of the joint. The connector is secured with any desired angular orientation by bolt 73 passing through module (c) and nut 74. As shown in FIG. 63, the connector may optionally be strengthened by diagonal brace 75 joining two tubular members together mounted in bosses 60 by screw connections 76.

Figures 64, 65, 66, 67, 68, 91, 92, 93:
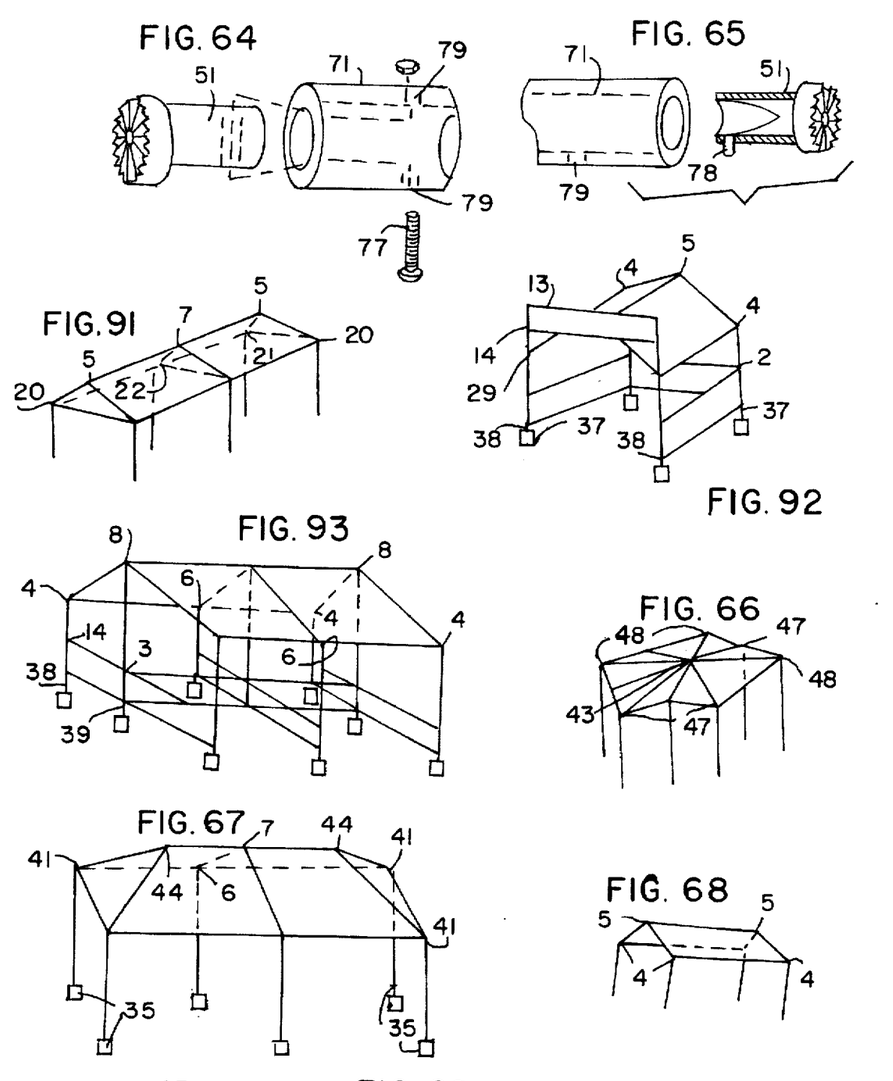
FIG. 64 is an exploded view of another module of the invention shown fitting inside an elongate tubular element.
FIG. 65 is an exploded view of another module shown partially in section fitting inside an elongate tubular element.
FIGS. 66–93, shown as perspective stick figures, illustrate the use of the various connectors in the fabrication of shelter frames with reference numerals referring to the Fig. numbers of the connectors.
Figure 69:
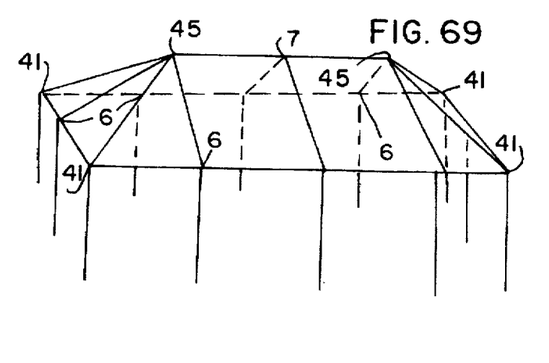
Figure 70:
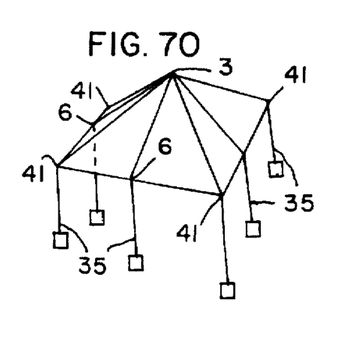
Figures 71, 72, 73, 74, 75, 76, 77, 78, 79:
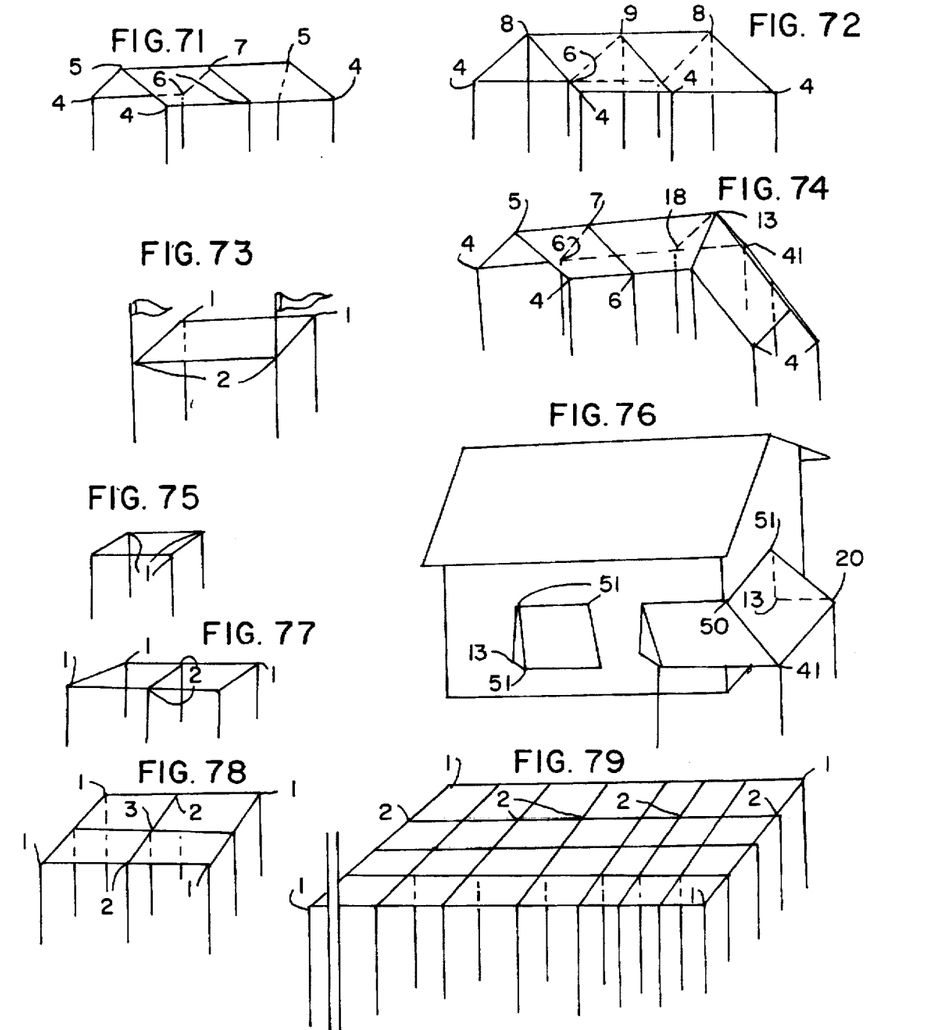
Figure 80:
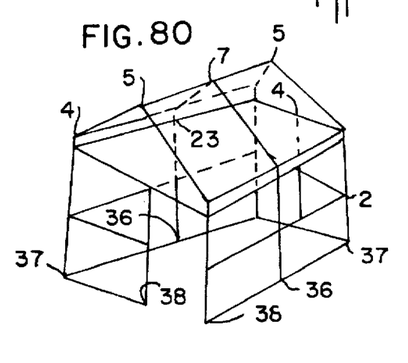
Figure 81:
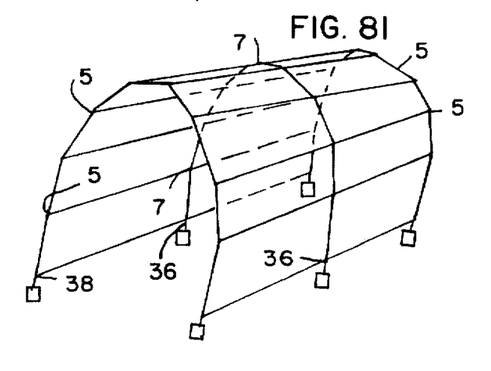
Figures 82, 84, 85, 86, 87, 88, 89, 90:
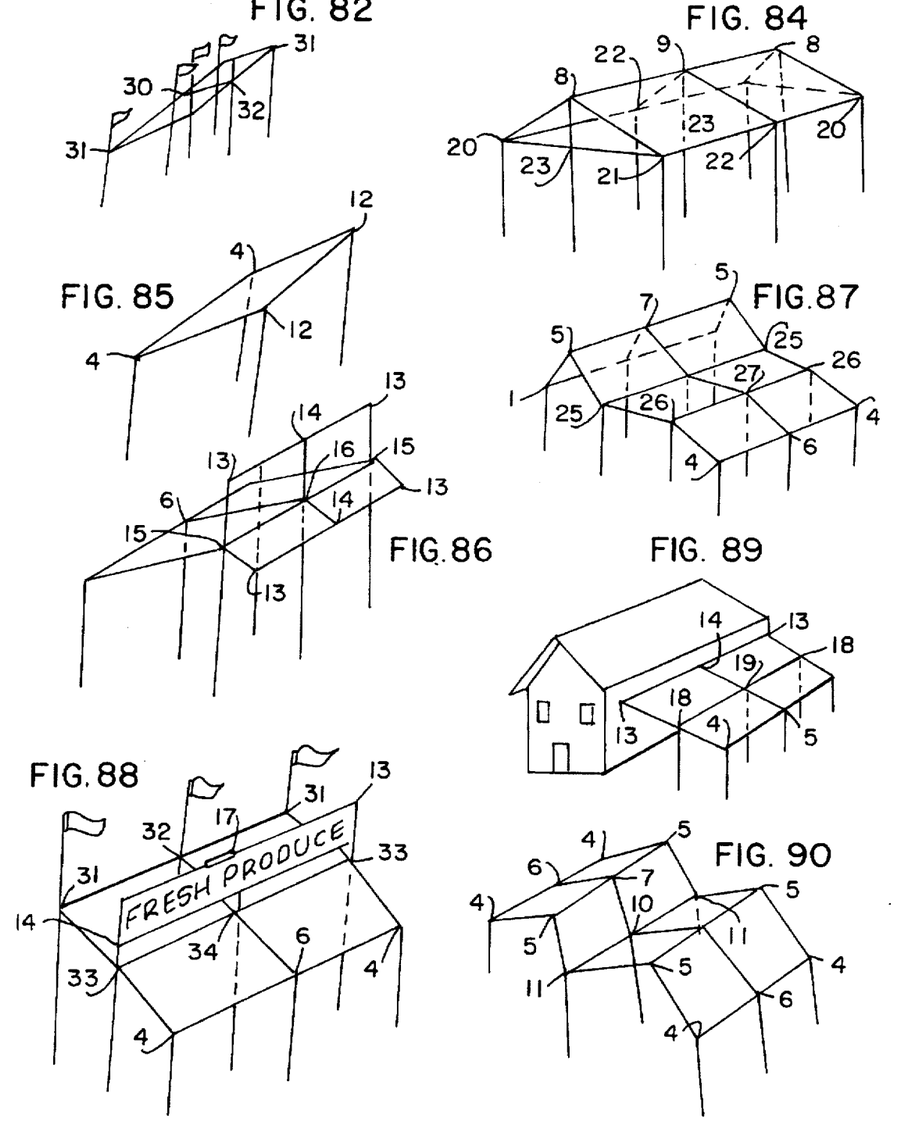
Figure 83:
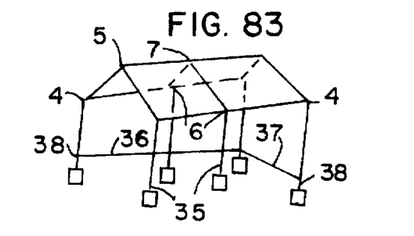

Referring now to FIGS. 64 and 65, an alternative structure and operation of the connecting member 51 for connecting the module to an elongate rigid tubular element 71 is shown adapted to fit inside the tubular element 71 instead of the sleeve type member fitting over the tubular element. When received inside element 71 it may be held in place by various means well known in the art disposed transverse to the long axis such as the through bolt 77 of FIG. 64 or the spring clip 78 of FIG. 65 engaging holes 79 in the tube 71.

FIGS. 1–50 show a variety of connectors which can be assembled by various combinations of the modules (a) (b) (c) (d) (e) (f).

FIGS. 35–40 illustrate various connectors using the base module (f) for mounting a frame or railing to a flat surface such as a pavement or a wall.

FIGS. 41–45 show a variety of connectors using the ring or center module (e) in combination with different numbers of modules (b) to form the center connector for frames with peaks such as the frames of FIGS. 66, 67, 69, 70.

Figure 1:
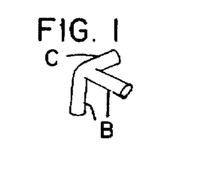
Figure 2:
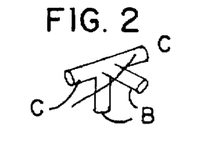
Figure 3:
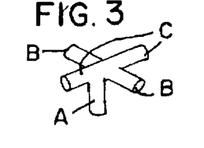
Figure 4:
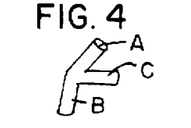
Figure 5:
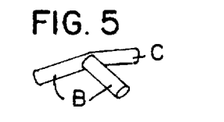
Figure 6:
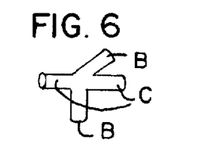
Figure 7:
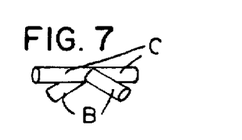
Figures 11, 43, 44, 45, 46, 47, 48, 49, 50:
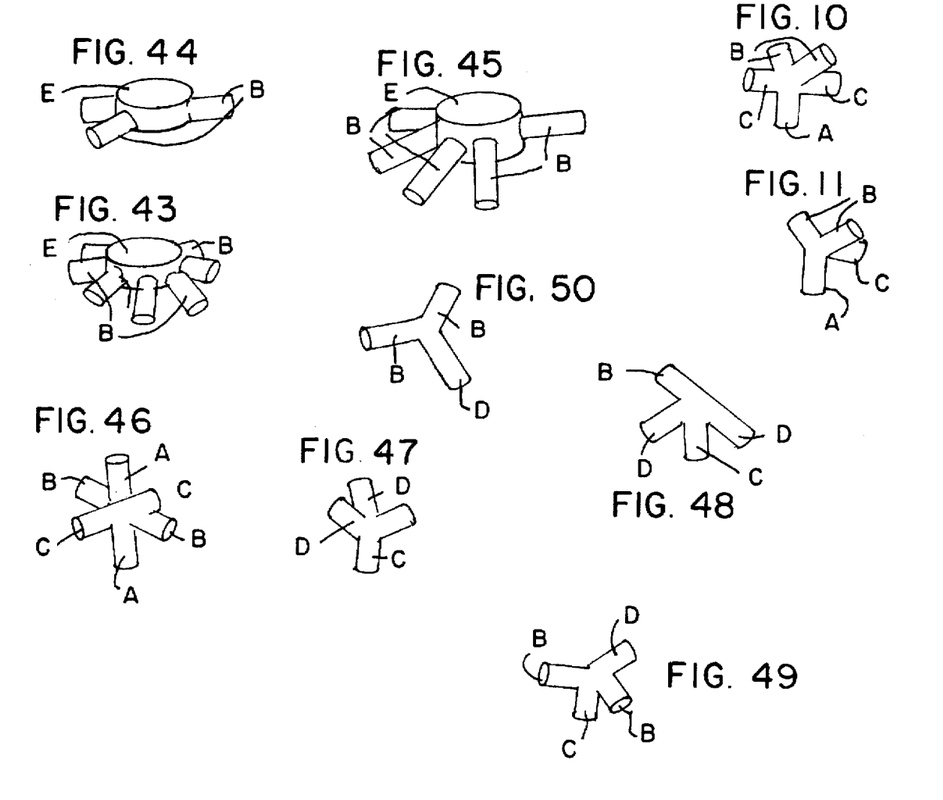
Figures 12, 20:
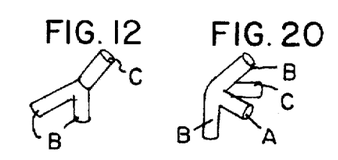
Figure 13:
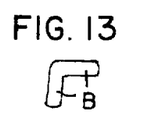
Figure 14:
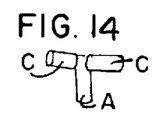
Figure 15:
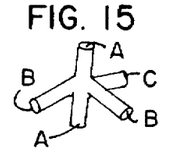
Figure 16:
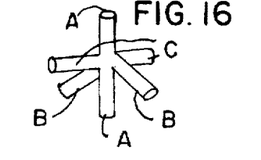
Figure 17:
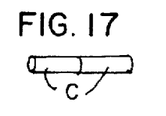
Figure 18:
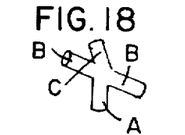
Figure 19:
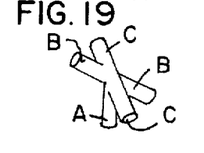
Figure 21:
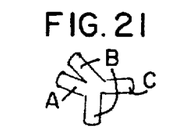
Figure 22:
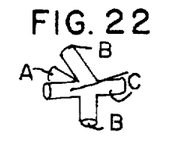
Figure 23:
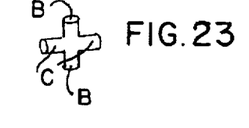
Figure 24:
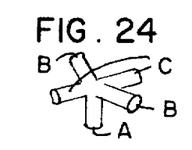
Figure 25:
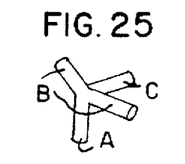
Figure 26:
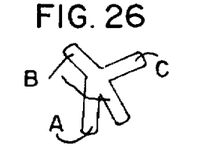
Figure 27:
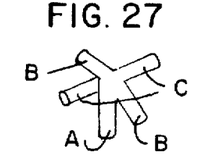
Figure 28:
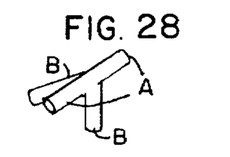
Figure 29:
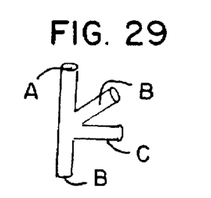
Figure 30:
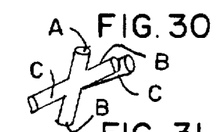
Figure 31:
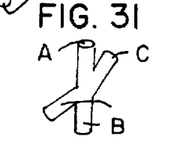
Figure 32:
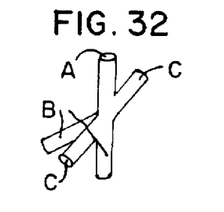
Figure 33:
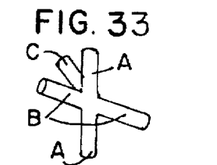
Figure 34:
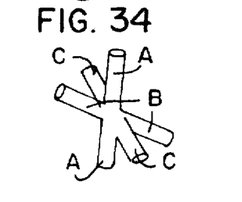
Figure 35:
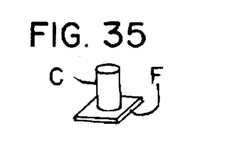
Figure 36:
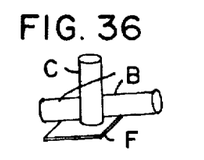
Figure 37:
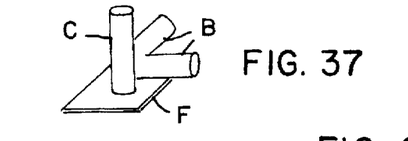
Figures 38, 41:
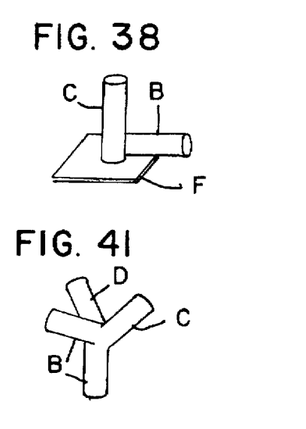
Figure 39:
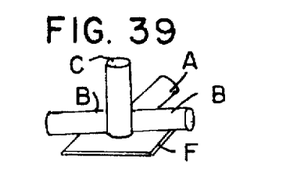
Figure 40:
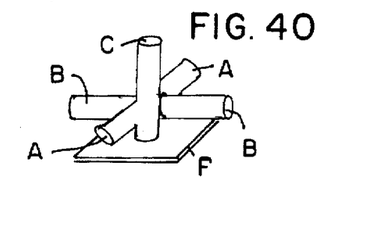
Figure 42:
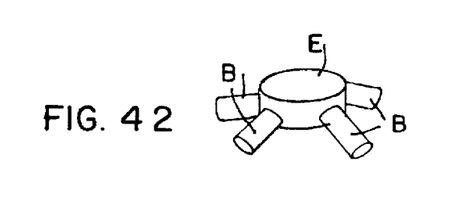
Figure 94:
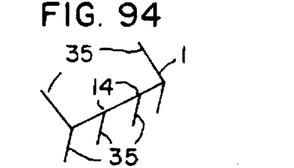
FIG. 94 is a perspective stick figure of a balcony hand rail or rack formed with the connectors assembled with modules of the invention.

FIG. 94 shows a balcony railing or rack frame formed from connectors shown in FIGS. 1, 14 and 35 assembled from modules of the invention.

FIGS. 66–93 show, as perspective stick figures, various frame configurations formed by rigid elongate elements joined together by connectors formed by assemblies of the modules of the invention. In the FIGS. 66–93, the reference numerals refer to the connectors shown in the figures of the corresponding numbers. As shown in the various drawing figures, the elongate rigid elements are cylindrical and the tubular members and connecting members that engage the rigid elements have circular cross sections The above disclosed invention has a number of particular features which should preferably be employed in combination although each is useful separately without departure from the scope of the invention. While I have shown and described the preferred embodiments of my invention, it will be Understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A system of modules having different structures which are removably joinable together by a bolt or screw fastener to form a plurality of connectors having different configurations, the connectors adapted for connecting elongate rigid cylindrical elements together to form a variety of different frame shapes, the modules comprising:

a) a first module having a tubular member with a long axis and circular cross section, an open first end and a second end, the tubular member adapted for receiving through the first end an elongate rigid cylindrical element; screw means connected to the member for effecting a binding action on the rigid element; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to said long axis on opposite sides thereof; and a bolt hole passing through both faces at the center of the annulus;

b) a second module having a tubular member with a long axis and circular cross section, an open first end and a second end, the tubular member adapted for receiving through the first end an elongate rigid cylindrical element; screw means connected to the member for affecting a binding action on the rigid element; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to one another, with one of the planes substantially in common with said long axis; and a bolt hole passing through both faces at the center of the annulus;

c) a third module having a tubular member with a long axis and circular cross section, an open first end and a second end, the tubular member adapted for receiving through the first end an elongate rigid cylindrical element; screw means connected to the member for affecting a binding action on the rigid element, the screw means operating transverse to the long axis; a lug attached to the second end, the lug having a broad face with intermeshing means arranged contiguously and continuously through 360° in a circular annulus about a center to mate with similar intermeshing means at adjustable angles, the face being disposed in a plane transverse to said long axis; and a bolt hole passing through the lug at the center of the annulus;

d) a fourth module having a tubular member with a long axis and circular cross section, an open first end and a second end, the tubular member adapted for receiving through the first end an elongate rigid cylindrical element; screw means connected to the member for effecting a binding action on the rigid element; a lug attached to the second end, the lug having two parallel, broad faces, the broad faces each being provided with intermeshing means arranged through 360° in a circular annulus about a center to mate with similar intermeshing means, the faces being disposed in planes parallel to one another, the face planes intersecting said long axis at an angle of between about 15° and about 75°, and a bolt hole passing through both faces at the center of the annulus; and e) a fifth module having a body with a smooth spheroidal top portion; a plurality of lugs, each lug having two parallel, broad faces, one or both faces being provided with intermeshing means arranged through 360° in a circular annulus about a center to mate with similar intermeshing means, the faces being disposed in facial planes parallel to one another, with a bolt hole passing through both faces at the center of the annulus, the lugs being attached to the body below the top portion with the facial planes disposed radially about a central point.

2. The system, according to claim 1, further comprising a flat connector module having a body with a flat bottom surface, and an upper surface; and a lug attached to the body at said upper surface, the lug having a broad upper face with intermeshing means arranged through 360° in a circular annulus about a center to mate with similar intermeshing means at adjustable angles, the face being disposed in a plane parallel to the bottom surface; and a bolt hole passing through the lug at the center of the annulus, the body extending radially beyond the lug on all sides thereof.

3. The system according to claim 1, further comprising an angle shifting disc, the disc having two broad parallel faces with identical intermeshing means arranged through 360° in a circular annulus about a center to mate with similar intermeshing means, with the intermeshing means of one face adapted to be exposed at an angle shifted relative to the intermeshing means of the other face, and a bolt hole passing through the disc at the centers of the annuli.

4. The system according to claim 1 in which at least two of the tubular members are provided with brace connecting means adapted for removably connecting to a rigid brace for joining two tubular members together.

5. A system of modules having different structures which are removably joinable together by a bolt or screw fastener to form a plurality of connectors having different configurations, the connectors adapted for connecting elongate rigid cylindrical elements together to form a variety of different frame shapes, the modules comprising:

a) a first module having a tubular member with a long axis and circular cross section, an open first end end a second end, the tubular member adapted for receiving through the first end an elongate rigid cylindrical element; screw means connected to the member for effecting a binding action on the rigid element; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to said long axis on opposite sides thereof; and a bolt hole passing through both faces at the center of the annulus;

b) a second module having a tubular member with a long axis and circular cross section, an open first end and a second end, the tubular member adapted for receiving through the first end an elongate rigid cylindrical element; screw means connected to the member for effecting a binding action on the rigid element; a lug attached to the second end, the lug having two parallel, broad faces, the broad faces earth being provided with intermeshing means arranged contiguously and continuously through 360° in a circular annulus about a center to mate with similar intermeshing means at adjustable angles, the faces being disposed in planes parallel to one another, with one of the planes substantially in common with said long axis; and a bolt hole passing through both faces at the center of the annulus; and c) a third module having a tubular member with a long axis and circular cross section, an open first end and a second end, the tubular member adapted for receiving through the first end an elongate rigid cylindrical element; screw means connected to the member for effecting a binding action on the rigid element, the screw means operating transverse to the long axis; a lug attached to the second end, the lug having a broad face with intermeshing means arranged contiguously and continuously through 360° in a circular annulus about a center to mate with similar intermeshing means at adjustable angles, the face being disposed in a plane transverse to said long axis; and a bolt hole passing through the lug at the center of the annulus.

6. The system according to claim 5, further comprising a flat connector module having a body with a flat bottom surface, and an upper surface; and a lug attached to the body at said upper surface, the lug having a broad upper face with intermeshing means arranged through 360° in a circular annulus about a center to mate with similar intermeshing means at adjustable angles, the face being disposed in a plane parallel to the bottom surface; and a bolt hole passing through the lug at the center of the annulus, the body extending radially beyond the lug on all sides thereof.

7. The system according to claim 5, further comprising an angle shifting disc, the disc having two broad parallel faces with identical intermeshing means arranged through 360° in a circular annulus about a center to mate with similar intermeshing means, with the intermeshing means of one face being angularly shifted relative to the intermeshing means of the other face, and a bolt hole passing through the disc at the centers of the annuli.

8. The system according to claim 5 in which at least two of the tubular members are provided with brace connecting means adapted for removably connecting to a rigid brace for joining two tubular members together.

9. A system of modules having different structures which are removably joinable together by a bolt or screw fastener to form a plurality of connectors having different configurations, the connectors adapted for connecting elongate rigid cylindrical elements together to form a variety of different frame shapes, the modules comprising:

a) a first module having a connecting member with a long axis and a circular cross section, a first end and a second end, the connecting member adapted for engaging by the first end an elongate rigid cylindrical tubular element; binding means for securely binding the connecting member to the engaged rigid element, the rigid means being disposed transverse to the long axis; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to said long axis on opposite sides thereof; and a bolt hole passing through both faces at the center of the annulus;

b) a second module having a connecting member with a axis and a circular cross section, a first end and a second end, the connecting member adapted for engaging by the first end an elongate rigid cylindrical tubular element; binding means for securely binding the connecting member to the engaged rigid element, the binding means being disposed transverse to the long axis; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to one another, with one of the planes substantially in common with said long axis; and a bolt hole passing through both faces at the center of the annulus;

c) a third module having a connecting member with a long axis and a circular cross section, a first end and a second end, the connecting member adapted for engaging by the first end an elongate rigid cylindrical tubular element;

binding means for securely binding the connecting member to the engaged rigid element, the binding means being disposed transverse to the long axis;

a lug attached to the second end, the lug having a broad face with intermeshing means arranged through 360° in a circular annulus about a center to mate with similar intermeshing means at adjustable angles, the face being disposed in a plane transverse to said long axis; and a bolt hole passing through the lug at the center of the annulus;

d) a fourth module having a connecting member with a long axis and a circular cross section, a first end and a second end, the connecting member adapted for engaging by the first and an elongate rigid cylindrical tubular element:

binding means for securely binding the connecting member to the engaged rigid element, the binding means being disposed transverse to the long axis;

a lug attached to the second end, the lug having two parallel, broad faces, the broad faces each being provided with intermeshing means arranged contiguously and continuously through 360° in a circular annulus about a center to mate with similar intermeshing means, the faces being disposed in planes parallel to one another, the face planes intersecting said long axis at an angle of between about 15° and about 75°, and a bolt hole passing through both faces at the center of the annulus; and e) a fifth module having a body with a smooth spheroidal top portion; a plurality of lugs, each lug having two parallel, broad faces, one or both faces being provided with intermeshing means arranged through 360° in a circular annulus about a center to mate with similar intermeshing means, the faces being disposed in facial planes parallel to one another, with a bolt hole passing through both faces at the center of the annulus, the lugs being attached to the body below the top portion with the facial planes disposed radially about a central point.

10. The system according to claim 9 in which the connecting member is adapted to engage a rigid cylindrical tubular element by fitting inside an open end thereof.

11. A system of modules having different structures which are removably joinable together by a bolt or screw fastener to form a plurality of connectors having different configurations, the connectors adapted for connecting elongate rigid cylindrical elements together to form a variety of different frame shapes, the modules comprising:

a) a first module having a tubular member with a long axis and a circular cross section, an open first end and a second end, the tubular member adapted for receiving through the first end an elongate rigid cylindrical element; screw means connected to the member for effecting a binding action on the rigid element; a lug attached to the second end, the lug having two parallel, broad faces, the broad faces each seing provided with intermeshing means arranged contiguously and continuously through 360° in a circular annulus about a center to mate with similar intermeshing means at adjustable angles, the faces being disposed in planes parallel to said long axis on opposite sides thereof; and a bolt hole passing through both faces at the center of the annulus; and b) a second module having a tubular member with a long axis and a circular cross section an open first end and a second end, the tubular member adapted for receiving through the first end an elongate rigid cylindrical element; screw means connected to the member for effecting a binding action on the rigid element; a lug attached to the second end, the lug having two parallel, broad faces, the broad faces each being provided with intermeshing means arranged contiguously and continuously through 360° in a circular annulus about a center to mate with similar intermeshing means at adjustable angles, the faces being disposed in planes parallel to one another, with one of the planes substantially in common with said long axis; and a bolt hole passing through both faces at the center of the annulus.

12. The system according to claim 11, further comprising a third module having a body with a smooth spheroidal top portion; a plurality of lugs, each lug having two parallel, broad faces, the broad faces each being provided with intermeshing means arranged through 360° in a circular annulus about a center to mate with similar intermeshing means, the faces being disposed in facial planes parallel to one another, with a bolt hole passing through both faces at the center of the annulus, the lugs being attached to the body below the top portion with the facial planes disposed radially about a central point.

13. The system according to claim 11, further comprising a flat connector module having a body with a flat bottom surface, and an upper surface; and a lug attached to the body at said upper surface, the lug having a broad upper face with intermeshing means arranged through 360° in a circular annulus about a center to mate with similar intermeshing means at adjustable angles, the face being disposed in a plane parallel to the bottom surface; and a bolt hole passing through the lug at the center of the annulus, the body extending radially beyond the lug on all sides thereof.

14. The system according to claim 11, further comprising an angle shifting disc, the disc having two broad parallel faces with identical intermeshing means arranged through 360° in a circular annulus about a center to mate with similar intermeshing means, with the intermeshing means of one face adapted to be exposed at an angle shifted relative to the intermeshing means of the other face, and a bolt hole passing through the disc at the centers of the annuli.

15. The system according to claim 11, further comprising a third module having a tubular member with a long axis, an open first end and a second end, the tubular member adapted for receiving through the first end an elongate rigid element; screw means connected to the member for effecting a binding action on the rigid element; a lug attached to the second end, the lug having two parallel, broad faces, the broad faces each being provided with intermeshing means arranged contiguously and continuously through 360° in a circular annulus about a center to mate with similar intermeshing means, the faces being disposed in planes parallel to one another, the face planes intersecting said long axis at an angle of between about 15° and about 75°, and a bolt hole passing through both faces at the center of the annulus.

16. The system according to claim 15, further comprising a fourth module having a body with a smooth spheroidal top portion; a plurality of lugs, each lug having two parallel, broad faces, one or both faces being provided with intermeshing means arranged through 360° in a circular annulus about a center to mate with similar intermeshing means, the faces being disposed in facial planes parallel to one another, with a bolt hole passing through both faces at the center of the annulus, the lugs being attached to the body below the top portion with the facial planes disposed radially about a central point.

17. The system according to claim 16, further comprising a flat connector module having a body with a flat bottom surface, and an upper surface; and a lug attached to the body at said upper surface, the lug having a broad upper face with intermeshing means arranged through 360° in a circular annulus about a center to mate with similar intermeshing means at adjustable angles, the face being disposed in a plane parallel to the bottom surface; and a bolt hole passing through the lug at the center of the annulus, the body extending radically beyond the lug on all sides thereof.

18. The system according to claim 17, further comprising an angle shifting disc, the disc having two broad parallel faces with identical intermeshing means arranged through 360° in a circular annulus about a center to mate with similar intermeshing means, with the intermeshing means of one face adapted to be exposed at an angle shifted relative to the intermeshing means of the other face, and a bolt hole passing through the disc at the centers of the annuli.

* * * * *